(12) United States Patent
Abecassis et al.

(10) Patent No.: US 8,022,123 B2
(45) Date of Patent: *Sep. 20, 2011

(54) METHOD FOR MANUFACTURING AND DISPERSING NANOPARTICLES IN THERMOPLASTICS

(75) Inventors: David Abecassis, Huntington, NY (US); Ed Wiegel, Baltimore, MD (US); Bosley Wright, Owings Mills, MD (US)

(73) Assignee: Glen Burnie Technologies, LLC

( * ) Notice: Subject to any disclaimer, the term of this patent is extended or adjusted under 35 U.S.C. 154(b) by 1207 days.

This patent is subject to a terminal disclaimer.

(21) Appl. No.: 11/645,093

(22) Filed: Dec. 22, 2006

(65) Prior Publication Data

US 2010/0261820 A1 Oct. 14, 2010

Related U.S. Application Data

(60) Provisional application No. 60/753,625, filed on Dec. 22, 2005.

(51) Int. Cl.
*C08K 5/523* (2006.01)
*C08K 3/34* (2006.01)

(52) U.S. Cl. ........ 524/127; 524/140; 524/141; 524/445; 524/447

(58) Field of Classification Search ............... 524/127, 524/140, 141, 445, 447; 252/378 R, 182.3
See application file for complete search history.

(56) References Cited

U.S. PATENT DOCUMENTS

| | | |
|---|---|---|
| 4,600,741 A | 7/1986 | Aycock et al. |
| 4,690,976 A | 9/1987 | Hahnfeld |
| 5,069,818 A | 12/1991 | Aycock et al. |
| 5,109,066 A | 4/1992 | Ilenda et al. |
| 5,132,365 A | 7/1992 | Gallucci |
| 5,147,932 A | 9/1992 | Ilenda et al. |
| 5,202,380 A | 4/1993 | Ilenda et al. |
| 5,294,654 A | 3/1994 | Hellstern-Burell et al. |
| 5,304,593 A | 4/1994 | Nishio et al. |
| 5,357,022 A | 10/1994 | Banach et al. |
| 5,391,625 A | 2/1995 | Arjunan |
| 5,397,822 A | 3/1995 | Lee, Jr. |
| 5,409,996 A | 4/1995 | Shinohara et al. |
| 5,554,674 A | 9/1996 | Hamilton |
| 5,596,040 A | 1/1997 | Miya et al. |
| 5,641,833 A | 6/1997 | Jung et al. |
| 5,674,931 A | 10/1997 | Gallagher et al. |
| 5,717,021 A | 2/1998 | Huang et al. |
| 5,739,087 A | 4/1998 | Dennis et al. |
| 5,760,125 A | 6/1998 | Ohtomo et al. |
| 5,780,376 A | 7/1998 | Gonzales |
| 5,959,063 A | 9/1999 | Huang et al. |
| 5,990,235 A | 11/1999 | Terano |
| 6,100,334 A | 8/2000 | Abdou-Sabet |
| 6,165,309 A | 12/2000 | Burnell |
| 6,166,115 A | 12/2000 | Landa |
| 6,174,944 B1 | 1/2001 | Chiba et al. |
| 6,239,196 B1 | 5/2001 | Bussi et al. |
| 6,228,912 B1 | 6/2001 | Kubolera |
| 6,388,046 B1 | 5/2002 | Campbell |
| 6,414,084 B1 | 7/2002 | Adedeji |
| 6,423,766 B1 | 7/2002 | Itagaki |
| 6,432,548 B1 | 8/2002 | Alex et al. |
| 6,433,046 B1 | 8/2002 | Campbell |
| 6,486,241 B2 | 11/2002 | Sawano |
| 6,486,257 B1 | 11/2002 | White et al. |
| 6,518,362 B1 | 2/2003 | Clough et al. |
| 6,540,945 B2 | 4/2003 | Kubotera et al. |
| 6,569,929 B2 | 5/2003 | Falcone et al. |
| 6,576,700 B2 | 6/2003 | Patel |
| 6,579,926 B2 | 6/2003 | Patel |
| 6,583,205 B2 | 6/2003 | Landa |
| 6,610,770 B1 | 8/2003 | Ross et al. |
| 6,630,526 B2 | 10/2003 | Heinen |
| 6,632,442 B1 | 10/2003 | Chyall et al. |
| 6,649,704 B2 | 11/2003 | Brewer et al. |
| 6,657,008 B2 | 12/2003 | Iwashita et al. |
| 6,730,719 B2 | 5/2004 | Powell et al. |
| 6,743,846 B2 | 6/2004 | Landa et al. |
| 6,747,096 B2 | 6/2004 | White et al. |
| 6,787,592 B1 | 9/2004 | Powell et al. |
| 6,809,159 B2 | 10/2004 | Adedeji |
| 6,835,774 B2 | 12/2004 | White et al. |
| 6,852,799 B2 | 2/2005 | Baidak et al. |
| 6,887,938 B2 | 5/2005 | Atkinson |
| 6,890,502 B2 | 5/2005 | Bauer et al. |
| 6,905,693 B2 | 6/2005 | Chyall et al. |
| 6,906,127 B2 | 6/2005 | Liang et al. |
| 6,949,605 B2 | 9/2005 | Shankernarayanan et al. |
| 6,989,190 B2 | 1/2006 | Gaggar et al. |
| 7,019,056 B2 | 3/2006 | Seidel et al. |
| 7,026,386 B2 | 4/2006 | Onishi |
| 7,049,353 B2 | 5/2006 | Conroy et al. |
| 7,056,093 B2 | 6/2006 | Patel |
| 7,069,788 B2 | 6/2006 | Hucks et al. |
| 7,084,197 B2 | 8/2006 | Chin et al. |
| 7,091,302 B2 | 8/2006 | Kirhhoff |
| 7,115,677 B2 | 10/2006 | Harashina et al. |
| 7,138,452 B2 | 11/2006 | Kim et al. |
| 7,173,092 B2 | 2/2007 | Gornowicz et al. |
| 2001/0025076 A1 * | 9/2001 | Lan et al. .................. 524/445 |
| 2002/0006997 A1 | 1/2002 | Adedeji |
| 2003/0176537 A1 | 9/2003 | Chaiko |
| 2005/0004294 A1 | 1/2005 | Chin |
| 2006/0118002 A1 | 6/2006 | Steinmetz |

FOREIGN PATENT DOCUMENTS

| | | |
|---|---|---|
| WO | WO 99/43747 | 9/1999 |
| WO | WO 0061683 | 10/2000 |
| WO | WO 0168760 | 9/2001 |
| WO | WO 0222729 | 3/2002 |
| WO | WO 03055792 | 7/2003 |
| WO | WO 2006080714 | 8/2006 |

* cited by examiner

*Primary Examiner* — Peter Szekely
(74) *Attorney, Agent, or Firm* — Thomas A. O'Rourke; Bodner & O'Rourke, LLP

(57) ABSTRACT

Clays and organoclays which are treated with resorcinol diphosphate and/or bisphenol diphosphate as general nanoparticle particle dispersants and replacements for quaternary amines. The two compounds are used as self activating and self dispersing nanoparticles by localizing themselves on the particle surface in a polymer matrix and acting as a nanoparticle dispersants in general, as well as resulting in exfoliation of clays. The exfoliate clays may be used in polymers in lieu of other organic treatments.

12 Claims, No Drawings

METHOD FOR MANUFACTURING AND DISPERSING NANOPARTICLES IN THERMOPLASTICS

This application claims priority on U.S. Provisional Patent Application Ser. No. 60/753,625 filed Dec. 22, 2005 the disclosures of which are incorporated by reference.

FIELD OF THE INVENTION

The present invention is directed to a method of formulating exfoliated clay blends and the exfoliated clay blends thereformed. The invention also relates to improved polymer blends containing exfoliated clay blends.

BACKGROUND OF THE INVENTION

The use of nano-particle additives has been driven in many ways, either by processing or chemical treatment in the attempt to uniformly distribute the particles throughout the polymer in order to obtain a uniform material with homogenous properties. In some specific instances the processor, tries to obtain spatial localization of nano-particle fillers within the material, as is the case with many electronic nanocomposites. Nanoclays and other additives such as carbon nanotubes are most often treated or processed for maximum dispersion.

Exfoliated clays have a variety of applications. One application of these clays is in polymer clay nanocomposites. These clay nanocomposites are polymer matrices containing platelet shaped clay particles that have sizes of a few nanometers thick. Because of their high aspect ratios and their high surface area, clay can import unique combinations of physical and chemical properties to make the polymer.

The clay particles used in nanocomposites occur naturally as layered silicates. In order to obtain the benefits of the clay particles, the clay particles are preferably exfoliated, i.e. delaminated and uniformly dispersed in the polymer matrix.

When clay is blended with a polymer, one of the problems that can be encountered is the incompatibility between the hydrophilic polymer and the hydrophilic clay particle surface. As a result of this incompatibility, there is a risk that the exfoliated clay particles do not remain exfoliated and it can be difficult to achieve a uniform dispersion of the clay particles throughout the blend. To solve this problem, clays have been treated with an organic compound to create an organoclay. An organoclay has an organic material bonded to a surface of the clay particle that permits the clay particle to remain exfoliated and enhances the blending of the hydrophilic clay in the hydrophilic polymer. The bonding of the organic material to the clay to produce the organoclay requires a number of steps in the process. One type of material that has been used to form the organoclays has been an ammonium compound such as a quaternary ammonium compound. In order to form the organoclays with quaternary ammonium compound, the quaternary ammonium compound is grafted to the clay particles.

While grafted polymers onto clay particles has aided exfoliation of clay particles, it does not typically provide complete exfoliation. As a result, there is a need for an improved process of exfoliating clays.

OBJECTS OF THE INVENTION

It is an object of the invention to provide an improved process for exfoliating clay.

It is also an object of the invention to provide improved exfoliated clays.

It is a still further object of the invention to provide improved blends of exfoliated clays and resorcinol diphosphate and/or bisphenol diphosphate.

It is another object of the invention to provide improved polymer blends of one or more polymers and an exfoliated clay that has been treated with a resorcinol diphosphate and/or bisphenol diphosphate.

SUMMARY OF THE INVENTION

The present invention is an organic treatment carried out typically in a single processing step, which replaces the need for multi-stage chemical treatments and elaborate processing of the polymer in order to obtain homogeneity of the final nano-composite material when the additive is mixed with a polymer.

The present invention includes a method of forming an exfoliated clay by blending a clay with resorcinol diphosphate (RDP) such that the resorcinol diphosphate coats at least a portion of the surface of the clay platelet, thereby providing improved exfoliation. Alternatively, the clay platelet may be blended with bisphenol diphosphate (BDP). The chemical dispersants for the invention have no precedent in their use which would have indicated their applicability for such dispersion. Issued patents for BDP deal with it's use as a flame retardant or as a precursor for polycarbonate synthesis. As for the RDP; it's described uses are as a flame retardant additive or as a plasticizer for plastic impact modification. It is often used in conjunction with complex multicomponent packages designed to boost plastic mechanical or flame retardant properties.

The present invention also includes the composition formed from the blending of the clay with either resorcinol diphosphate or bisphenol diphosphate or blends thereof. In a preferred composition, there is about 99% to about 50% clay with the balance RDP. Similarly, another preferred composition is 99% to about 50% BDP. In this invention, the RDP or BDP or blends thereof physically coat the clay platelet and allows it to exfoliate. While it is possible to have compositions with more than 50% RDP or BDP, in such compositions the RDP and/or BDP acts as a plasticizer which may not always be a desired property for the particular application.

Other preferred compositions include blends of 95% to about 70% clay with the balance RDP and/or BDP.

In forming the blends of the present invention, it is preferred that the diphosphate material be heated to about 50° C. to about 100°. The liquid can be sprayed on to the clay and then the composition can be mechanically mixed to blend the materials together. Other means of mixing the clay and the diphosphate can be employed. It is also preferred that the diphosphate be heated to a temperature below its vapor point so that the diphosphate material is not lost.

Once the clay has been exfoliated by blending with RDP or BDP, the composition can be used in a variety of polymers and polymer blends. In a preferred embodiment, there is about 1% to about 25% by weight of the exfoliated clay blend with the balance the polymeric material.

The present invention may also be used with organoclays as well to enhance their exfoliation.

The improved polymer exfoliate clay blends of the present invention may be used in a variety of applications. The properties of the polymer blends of the present invention includes improved barrier properties including water and oxygen barrier properties. There are also improved vapor and moisture barrier properties in these compositions. The compositions of the present invention also have increased UV stability and improved flame retardant properties.

The compositions of the present invention also have improved processability. The exfoliated clay in the polymer keeps the viscosity of the polymer higher at higher temperatures with less back flow in extrusion and injection molding equipment.

DETAILED DESCRIPTION OF THE INVENTION

The clays used in the present invention are typically a smectite clay. A smectite clay is a natural or synthetic clay mineral selected from the group consisting of hectorite, montmorillonite, bentonite, beidelite, saponite, stevensite and mixtures thereof. A particularly preferred choice for the smectite is montmorillonite.

The present invention is an organic treatment carried out typically in a single processing step, which replaces the need for multi-stage chemical treatments and elaborate processing of the polymer in order to obtain homogeneity of the final nano-composite material when the additive is mixed with a polymer.

The present invention includes a method of forming an exfoliated clay by blending a clay with a diphosphate such as resorcinol diphosphate (RDP). The diphosphate coats at least a portion of the surface of the clay platelet, thereby providing improved exfoliation. Alternatively, the clay platelet may be blended with bisphenol diphosphate (BDP) or a blend of RDP and BDP. The chemical dispersants for the invention have no precedent in their use which would have indicated their applicability for such dispersion. Issued patents for BDP deal with it's use as a flame retardant or as a precursor for polycarbonate synthesis. As for the RDP; it's described uses are as a flame retardant additive or as a plasticizer for plastic impact modification. It is often used in conjunction with complex multicomponent packages designed to boost plastic mechanical or flame retardant properties.

The present invention also includes the composition formed from the blending of the clay with either resorcinol diphosphate or bisphenol diphosphate or blends thereof. In a preferred composition, there is about 99% to about 50% clay with the balance RDP. Similarly, another preferred composition is 99% to about 50% BDP. In this invention, the RDP or BDP or blends thereof physically coat at least a portion of the clay platelet and allows the clay platelet to exfoliate. While it is possible to have compositions with more than 50% RDP or BDP, in such compositions the RDP and/or BDP acts as a plasticizer which may not always be a desired property for the particular application. Other preferred compositions include blends of 99% to about 80% clay with the balance RDP and/or BDP.

In forming the blends of the present invention, it is preferred that the diphosphate material be heated to about 50° C. to about 100°. The liquid diphosphate can then be sprayed on to the clay. The composition containing the clay and the diphosphate can be mechanically mixed to blend the materials together. Other suitable means of mixing the clay and the diphosphate can be employed. It is also preferred that the diphosphate be heated to a temperature below its vapor point so that the diphosphate material is not vaporized.

Once the clay has been exfoliated by blending with RDP or BDP, the composition can be used in a variety of polymers and polymer blends. In a preferred embodiment, there is about 1% to about 25% by weight of the exfoliated clay blend with the balance the polymeric material. The present invention may also be used with organoclays as well to enhance their exfoliation.

The improved polymer exfoliate clay blends of the present invention may be used in a variety of applications. The properties of the polymer blends of the present invention includes improved barrier properties including water and oxygen barrier properties. There are also improved vapor and moisture barrier properties in these compositions. The compositions of the present invention also have increased UV stability and improved flame retardant properties.

The compositions of the present invention also have improved processability. The exfoliated clay in the polymer keeps the viscosity of the polymer higher at higher temperatures with less back flow in extrusion and injection molding equipment.

RDP and BDP are useful as a general dispersant for nanoparticles in a polymer matrix. Both of these diphosphates increase the exfoliation rate of nanoclays or prior organic surface treatments. The diphosphates replace the use of quaternary ammonium salts in organoclays used in nanocomposite polymers in order to achieve exfoliation inside the polymer matrix. The clays useful in the present invention include both natural and synthetic clays. The synthetically prepared smectite clays can include montmorillonite bentonite, beidelite, hectorite, saponite and stevensite clays.

The RDP/BDP blends of the present invention avoid the use of quaternary ammonium salts in organoclays used in nano-composite polymers in order to achieve exfoliation inside the polymer matrix. The clays can include a Wyoming variety of swelling bentonite and similar clays, and hectorite, which is a swelling magnesium-lithium silicate clay, as well as, synthetically prepared smectite-type clays, such as montmorillonite, bentonite, beidelite, hectoritesaponite, and stevensite.

The nanoparticles useful in the present invention can include at least one metal oxide, halide, oxyhalide or chalcogenide salt. Other nanoparticles can be selected from the group consisting of aluminosilicates, ZnS, ZnSe, PbSe, CdS and CdSe nanoparticles. Still other nanoparticles can include at least one metal fluoride or chloride salt.

The nanoparticles of the present invention have particular applicability in the formation of semi-conductors. The inorganic nanoparticles can include at least one Group III, IV or V semiconductor element, or at least one Group III V, Group II V, or Group II VI semiconductor compound, doped with one or more active ions.

Other inorganic nanoparticles can include at least one Group III, IV, or V semiconductor element selected from the group consisting of Si, Ga and As, doped with one or more active ions.

Also useful are inorganic nanoparticles that contain at least one Group III V semiconductor compound selected from the group consisting of GaAs, GaN and InN.

The nanoparticulate material of the present invention can include magnesium oxide nanoparticles and multicomponent oxide spheres that include a silica sphere coated with another oxide shell.

The nanoparticle material can be selected from the group consisting of a nanoclay, a carbon nanofiber, a polyhedral oligomeric silsesquioxane (POSS), a carbon nanotube, a nanoparticle mineral, nanoparticle silica, nanoparticle alumina, nanoparticle mica, nanoparticle graphite, nanoparticle carbon black, nanoparticle fumed carbon, nanoparticle fly ash, glass nanospheres, ceramic nanospheres, spherical fullerenes, and a combination thereof.

The nanoparticle material can also include at least one of Co, Fe, Ni, CoFe, NiFe, $Co_2O_3$, FeO, $Fe_2O_3$, $Fe_3O_4$, NiO, and ferrites including $MFe_2O_4$ where M comprises one of Co and Ni, and the hard magnetic material comprises at least one of CoPt, FePt, SmCo-based alloys, and NdFeB-based materials.

The nano-particles can also include Ti/Sb mixed oxide nanoparticles.

The present invention also includes a metal nanoparticle that contains at least one noble metal atom selected from the group consisting of gold, silver, platinum, and palladium.

Other nanoparticles can include at least one noble metal atom selected from the group consisting of gold, silver, platinum, palladium, iridium, rhenium, mercury, ruthenium, rhodium, copper, and osmium and/or at least one non-noble metal atom selected from the group consisting of iron, cobalt, vanadium, chromium, manganese, molybdenum, nickel, lead, cadmium, niobium, technetium, and tungsten.

There can also be metal based nanoparticles containing at least one compound selected from the group consisting of gold hydroxide, gold acetate, gold chloride, platinum chloride, silver acetylacetonate, silver citrate, silver lactate, silver nitrate, platinum acetylacetonate, palladium acetylacetonate, palladium acetate, palladium hydroxide, ruthenium acetylacetonate, copper ethoxide, $Fe(CO)_5$, $Fe_2(CO)_9$, $CO_2(CO)_8$, $V(CO)_6$, $Cr(CO)_6$, $Mn_2(CO)_{10}$, $Re_2(CO)_{10}$, $Ru_3(CO)_{12}$, $Mo(CO)_6$, $Os(CO)_5$, $Os_3(CO)_{12}$, $Ir_4(CO)_{12}$, $W(CO)_6$, $Tc_2(CO)_{10}$, $Ru(CO)_5$, $Rh(CO)_{12}$, $Pd(CO)_4$, $Pt(CO)_4$, and platinum-1,3-divinyl-1,1,3,3,-tetramethyldisiloxane.

The metal oxide of the nanoparticle can be a metal oxide selected from the group consisting of aluminum triethoxide, aluminum isopropoxide, aluminum sec-butoxide, aluminum tri-the-butoxide, magnesium trifluoroacetylacetonate, magnesium methoxide, magnesium ethoxide, titanium methoxide, titanium ethoxide, titanium isopropoxide, titanium propoxide, titanium butoxide, titanium ethylhexoxide, titanium (triethanolaminato)isopropoxide, titanium bis(ethyl acetoacetato)diisopropoxide, titanium bis(2,4-pentanedionate)diisopropoxide, zirconium ethoxide, zirconium isopropoxide, zirconium propoxide, zirconium sec-butoxide, zirconium thebutoxide, aluminum di-s-butoxide ethylacetonate, calcium methoxyethoxide, calcium methoxide, magnesium methoxyethoxide, copper ethoxide, copper methoxyethoxyethoxide, antimony butoxide, bismuth pentoxide, chromium isopropoxide, tin ethoxide, zinc methoxyethoxide, titanium n-nonyloxide, vanadium tri-n-propoxide oxide, vanadium triisobutoxide oxide, iron ethoxide, tungsten ethoxide, samarium isopropoxide, iron isopropoxide, cobalt methoxyethoxide, and lanthanum methoxyethoxide. The nanoparticle can also include an organosilane, preferably an organofunctional silane.

Other materials that can be used as the nanoparticle can include cadmium sulfide; and polyphosphate, ferrite, and apatite. The nanoparticle can also contain at least one metal oxide, halide, oxyhalide or chalcogenide salt.

The nanoparticles can also be selected from the group consisting of aluminosilicates, ZnS, ZnSe, PbS, PbSe, CdS and CdSe nanoparticles. The nanoparticles can also include at least one metal fluoride or chloride salt.

EXAMPLES

Example 1

High impact polystyrene resin was processed in a twin barrel 30 mm extruder using sodium bentonite treated with RDP at a loading rate of 20% weight RDP/weight clay and added into the polymer at 5% w-treated clay/w-polymer, and subjected to Dynamic Mechanical Analysis and TEM (Transmission electron microscope). Both DMA and TEM clearly illustrated that the individual clay particles had exfoliated and that the material was a nano-composite. Brabender results with the same composition confirmed the result. TEM images clearly showed exfoliation of the individual clay crystals in both case scenarios.

Example 2

High impact polystyrene resin was processed in a twin barrel 30 mm extruder using sodium bentonite treated with BDP at a loading rate of 20% weight BDP/weight clay and added into the polymer at 5% w-treated clay/w-polymer, and subjected to Dynamic Mechanical Analysis and TEM (Transmission electron microscope). Both DMA and TEM clearly illustrated that the individual clay particles had exfoliated and that the material was a nano-composite. Brabender results with the same composition confirmed the result. TEM images clearly showed exfoliation of the individual clay crystals in both case scenarios Example 3

Cloisite 20 A; a commercially available quaternary amine treated organoclay was treated with 0.2% w RDP and BDP/weight of polymer at 5% loading of the Cloisite. The resulting polymers showed remarkable and dramatic improvements in mechanical which properties; due to increased exfoliation of 20A, which were discernable during a DMA analysis of the resulting nano-composite; illustrating a remarkable increase in exfoliation rates of the clay.

What is claimed is:

1. A nanocomposite prepared by the process of mixing a smectite clay with a diphosphate to exfoliate the clay to form clay platelets and wherein said diphosphate is a resorcinol diphosphate, a bisphenol diphosphate or blends thereof and said blend of clay and diphosphate contains about 99% to about 50% by weight clay with the balance diphosphate.

2. The nanocomposite according to claim 1 wherein said clay is an organoclay.

3. The nanocomposite according to claim 1 wherein said blend of clay and diphosphate contains about 99% to about 80% by weight clay with the balance diphosphate.

4. The nanocomposite according to claim 3 wherein the blend of smectite clay and diphosphate is added to a polymer matrix such that the diphosphate treated smectite clay is exfoliated within the polymer matrix.

5. The nanocomposite according to claim 2 wherein said blend of organoclay and diphosphate contains about 99% to about 50% by weight organoclay with the balance diphosphate.

6. The nanocomposite according to claim 5 wherein said blend of organoclay and diphosphate contains about 99% to about 80% by weight clay with the balance diphosphate.

7. The method according to claim 1 wherein the diphosphate is heated to about 50° C. to about 100° C. prior to mixing with said clay.

8. The method according to claim 7 wherein said heated diphosphate is sprayed onto said clay.

9. The nanocomposite according to claim 1 wherein said exfoliated clay is dispersed in a polymer matrix.

10. A method of preparing a nanocomposite comprising heating a diphosphate to a temperature below its vaporization temperature and mixing said diphosphate with a smectite clay to form a diphosphate treated smectite clay and wherein said disphosphate treated smectite clay contains about 99% to about 50% by weight clay with the balance diphosphate.

11. The method according to claim 10 wherein the diphosphate is a resorcinol diphosphate, a bisphenol diphosphate or blends thereof.

12. The method according to claim 11 wherein the nanocomposite is dispersed in a polymer matrix.

* * * * *